No. 728,960. PATENTED MAY 26, 1903.
W. MOSLEY.
DELIVERY ATTACHMENT FOR BICYCLES.
APPLICATION FILED OCT. 13, 1902.
NO MODEL.
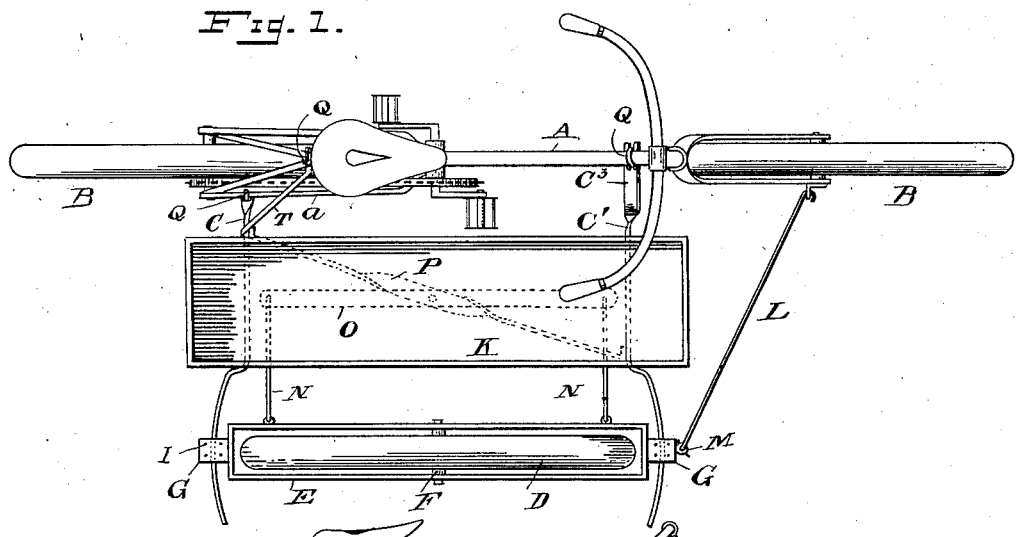
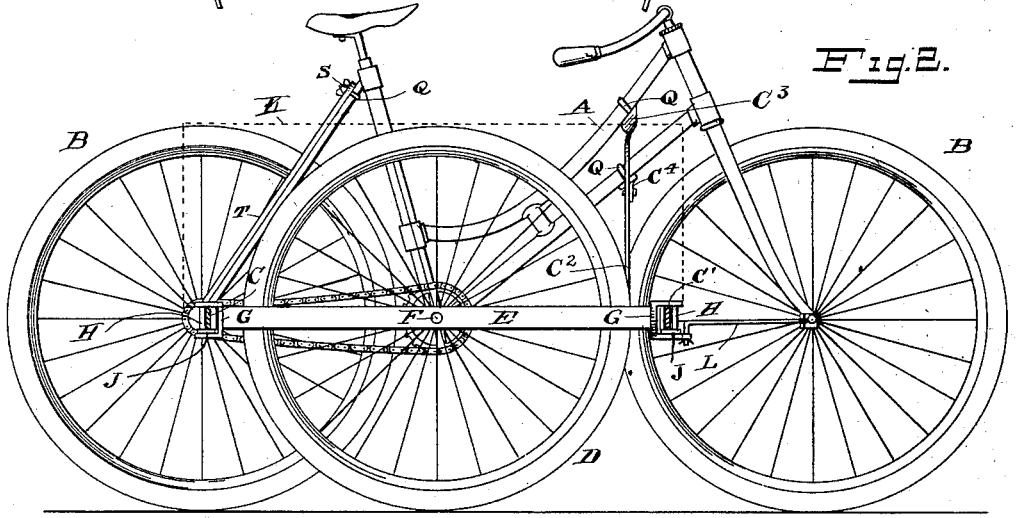
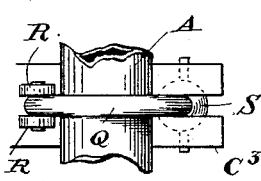
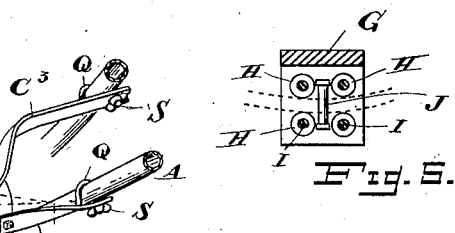
WITNESSES
Arthur Keithley
Mae Davis
INVENTOR
William Mosley,
By L. M. Thurlow,
ATTY.

No. 728,960.

Patented May 26, 1903.

UNITED STATES PATENT OFFICE.

WILLIAM MOSLEY, OF WASHINGTON, ILLINOIS.

DELIVERY ATTACHMENT FOR BICYCLES.

SPECIFICATION forming part of Letters Patent No. 728,960, dated May 26, 1903.

Application filed October 13, 1902. Serial No. 126,991. (No model.)

*To all whom it may concern:*

Be it known that I, WILLIAM MOSLEY, a citizen of the United States, residing at Washington, in the county of Tazewell and State of Illinois, have invented certain new and useful Improvements in Delivery Attachments for Bicycles; and I do hereby declare that the following is a full, clear, and exact description of the invention, which will enable others skilled in the art to which it appertains to make and use the same.

This invention relates to a three-wheeled vehicle for use in delivering parcels and the like or for conveying materials from one point to another.

The invention further relates to an attachment for bicycles for use in transporting goods.

The invention relates also to certain details of construction, which will be pointed out in the accompanying claims.

The object of the invention is to provide an attachment for any bicycle which can be quickly attached or detached and which carries a receptacle for containing and transporting considerable weight and materials, as above described.

In the accompanying drawings, which form a part of this application, Figure 1 is a plan view of a bicycle, showing my attachment connected therewith. Fig. 2 is a side elevation of the same. Fig. 3 is a top view of a clip for securing the attachment to the frame of the bicycle. Fig. 4 is a perspective view of portions of the bicycle-frame, showing the framework of my attachment and means for securing the same to said frame. Fig. 5 is a sectional top view of a bracket and its friction-rollers used as a part of my attachment.

A indicates the frame of an ordinary bicycle, and B B the wheels thereof.

My invention consists in providing a suitable frame for carrying a third wheel and receptacle, substantially as shown. This frame consists of two horizontal parallel bars C and C', the end of the first being attached to the rear horizontal reach $a$ of the bicycle. The latter bar is bent up at $C^2$, Fig. 4, into a vertical portion, which is again bent at right angles, as at $C^3$, and is secured to the frame A. A short bar $C^4$ is attached in rigid manner to the vertical portion $C^2$ and is attached in turn to the other frame portion of the bicycle, as shown. The outer ends of the bars C and C' are bent into arcs of a circle, substantially as shown, such arcs being parts of a circle struck from a point midway between such bent extremities. The said bars thus formed are suitably braced, so as to be rigid and immovable relatively. Now mounted between these curved extremities is a wheel D, corresponding in size and kind with those of the bicycle, though of course this is not absolutely necessary, but is preferable on account of appearance only. Said wheel is supported by means of a frame E by its axle F. Secured on each end of the said frame E is a bracket G in the form of an ⊏, as shown in Fig. 2. Between the upper and lower limbs of said brackets are a series of vertical rollers H, as shown in Fig. 5. These rollers have their bearings on the pins I, which are secured in said limbs. Four of the rollers H are provided for each bracket, and these are so located that the curved ends of the bars C and C' pass between two pairs of them, as indicated in broken lines in said Fig. 5. In addition to these rollers I also provide a horizontal roller J, which lies between the rollers at right angles to the bars and supports the latter, so as to reduce the friction of the parts, as will be hereinafter understood. On the bars described is mounted a box or receptacle of any desired form and indicated at K. The weight of the box and the frame which carries it is thrown upon the rollers J, and such weight is transmitted to the axle of the wheel D, as will be understood. To the front fork of the bicycle at any desired point thereof is attached the end of a rod L in loose manner, whose other end is also loosely attached to an eye M on the front bracket G of the wheel-frame E. Now by the structure described it will be seen that a movement of the front wheel of the bicycle, as in turning a corner in one direction or the other, will move the wheel D in the same direction. This must obtain, for the reason that the said wheel D turns on a vertical axis which passes through the base of the wheel and its axle, and since the curved ends of the bars C and C' are described from this axis as a center the wheel can swing in both directions. I have used the device thus constructed and its operation is perfectly satisfactory; but in addition to the structure described I may also employ the following: Near each end of the frame E is loosely attached a rod N, whose other end is connected with a bar O, pivoted at its middle length to a brace or reach P of the frame described. It will be seen that a movement of the front wheel as before described in transmitting motion to the frame E in the same direction will shift the rod N at the front end, which in turn will move the bar O on its pivot and push the opposite rod N in the opposite direction. By this means a positive action is assured in turning the wheel in the event that obstructions in the road would prevent the proper action of the device as first described.

In Fig. 3 I show a clip for attaching the bars C, C′, and C⁴ to the frame of the bicycle. This clip merely consists of a semicircular or U-shaped strip Q, one end of which is pivoted between ears R R on the bars and whose other end passes through a slot in the end of the bar and is provided with a wing-nut S. By placing the bars beneath the frame portions of the bicycle and throwing the clips over such frame portions, whereby the ends of such clips are carried into the slots, and tightening the wing-nuts the attachment is firmly held, as will be understood. Besides attaching the bars C and C′ to the bicycle, as described, a brace is provided at T, one end of which is secured to the bicycle-frame just beneath the saddle and the other end to the bar C. Evidently other braces may be employed, as desired, to add strength and rigidity to the parts. I desire to make it understood that the means for turning the wheel D and the manner of supporting such wheel may be altered, as there are a number of ways in which the same end may be accomplished, and therefore I am not limited to the form shown and described.

Having now described my invention, I claim—

1. In a device of the character described, the combination of a bicycle and a third wheel detachably secured thereto and arranged to move with the movements of the front steering-wheel for the purposes set forth.

2. A device of the character described comprising a bicycle, a third wheel therefor and detachably secured thereto, means for supporting the wheel and allowing a swinging movement thereof and means for steering the same from the front wheel of the bicycle for the purposes described.

3. A device of the character described comprising a bicycle, a third wheel situated at one side of such bicycle, a frame for carrying such wheel, means permitting a pivotal movement of said wheel on a vertical axis and connection between the frame which carries the wheel and the front steering-wheel for imparting movement to the said wheel on its vertical axis for the purposes indicated.

4. A device of the character described comprising a bicycle, a third wheel situated at one side of said bicycle, a frame secured to the frame of the bicycle and forming a support for said third wheel, a supporting-frame for the wheel the same having loose connection with the said frame having attachment to the bicycle, both such frames permitting a swinging movement on a vertical axis and means for steering the wheel by the movements of the front wheel of the bicycle.

5. A device of the character described comprising a bicycle, a third wheel situated at one side of said bicycle, a supporting-frame for said wheel, a frame having attachment to the bicycle and supporting the wheel-frame substantially as shown, an attachment at each end of the wheel-frame, rollers in said attachments for carrying the ends of the frame having attachment to the bicycle, a rod having attachment at one end with the said wheel-frame and at its other end with the steering-wheel of the bicycle all being arranged whereby the third wheel is permitted to swing on a vertical axis the same being swung by means of the said steering-wheel as set forth.

6. A device of the character described comprising the bicycle, the bars C and C′ connected to the frame thereof and detachable therefrom, the clips Q for attaching said bars to the bicycle, the third wheel D situated between the outer free ends of the bars, the outer ends of said bars being bent in arcs of a circle, the concaved surfaces thereof facing each other as shown, a receptacle mounted on the bars, a carrying-frame for the said third wheel, attachments on each end of such wheel-frame, friction-rollers within such attachments for receiving and guiding the curved bars C and C′, the steering-rod L connected with the wheel-frame and with the steering-wheel of the bicycle, the rods N N connected with the wheel-frame, and the pivoted rod P having one of the said rods N connected at each end thereof all arranged substantially as set forth and for the purposes described.

In testimony whereof I affix my signature in presence of two witnesses.

WILLIAM MOSLEY.

Witnesses:
E. J. ABERSOL,
L. M. THURLOW.